(12) United States Patent
Okazaki et al.

(10) Patent No.: US 7,281,710 B2
(45) Date of Patent: Oct. 16, 2007

(54) CONVEYOR SYSTEM AND METHOD OF SETTING OPERATION THEREOF

(75) Inventors: Jiro Okazaki, Tokyo (JP); Tsutomu Tanaka, Saitama-ken (JP); Yusuke Koshimura, Ishikawa (JP)

(73) Assignees: Honda Motor Co., Ltd., Tokyo (JP); Aida Engineering Ltd., Kanagawa (JP)

( * ) Notice: Subject to any disclaimer, the term of this patent is extended or adjusted under 35 U.S.C. 154(b) by 0 days.

(21) Appl. No.: 11/006,249

(22) Filed: Dec. 6, 2004

(65) Prior Publication Data

US 2005/0189703 A1 Sep. 1, 2005

(30) Foreign Application Priority Data

Dec. 22, 2003 (JP) ............................. 2003-425550

(51) Int. Cl.
*B65G 57/04* (2006.01)
(52) U.S. Cl. ..................... 271/193; 271/901; 271/3.18; 414/793.3; 198/679; 198/370.13; 198/472.1
(58) Field of Classification Search ................ 271/901, 271/176, 193, 275, 3.18, 3.21; 414/793.2, 414/793.3, 797.1, 790.2, 792.7, 792.9, 793.1, 414/793; 198/679, 370.13, 472.1, 690.1, 198/586; 451/333; 29/822, 823, 824
See application file for complete search history.

(56) References Cited

U.S. PATENT DOCUMENTS 2,527,911 A * 10/1950 Buccicone .................. 271/193
3,172,526 A * 3/1965 Buccicone .................. 271/182
3,727,758 A * 4/1973 Cleland .................. 198/370.13
3,795,301 A * 3/1974 Sugitani ..................... 198/404
3,834,519 A * 9/1974 Kitazawa et al. ........... 198/381
6,055,895 A * 5/2000 Kanazawa ..................... 83/24
6,840,733 B2 * 1/2005 Bjorn et al. ............. 414/794.4
2004/0062686 A1 * 4/2004 Ganz et al. ................. 422/100

FOREIGN PATENT DOCUMENTS

| DE | 10008832 | 9/2001 |
|---|---|---|
| JP | 64-027898 | 1/1989 |
| JP | 01-308348 | 12/1989 |
| JP | 02-46764 | 3/1990 |
| JP | 03-131418 | 6/1991 |
| JP | 08-295233 | 11/1996 |
| JP | 10-297761 | 11/1998 |
| JP | 2003-226431 | 8/2003 |

* cited by examiner

Primary Examiner—Patrick Mackey
Assistant Examiner—Jeremy R Severson
(74) Attorney, Agent, or Firm—Carrier, Blackman +Associates, P.C.; William D. Blackman; Joseph P. Carrier

(57) ABSTRACT

A conveyor system has a monitor for entering information about sheets, an input/output control console for setting operating conditions of a first conveyor and a second conveyor based on the information about the sheets, and a power control console for operating the first conveyor and the second conveyor based on the operating conditions. The information about the sheets includes information as to the length of each of the sheets and data as to the position where the sheets are loaded from a press. A conveyor feed length representative of a feed cycle of a sheet on the first conveyor and the second conveyor, and the number of sheets on the second conveyor are automatically determined based on the length of the sheets and the data.

4 Claims, 17 Drawing Sheets

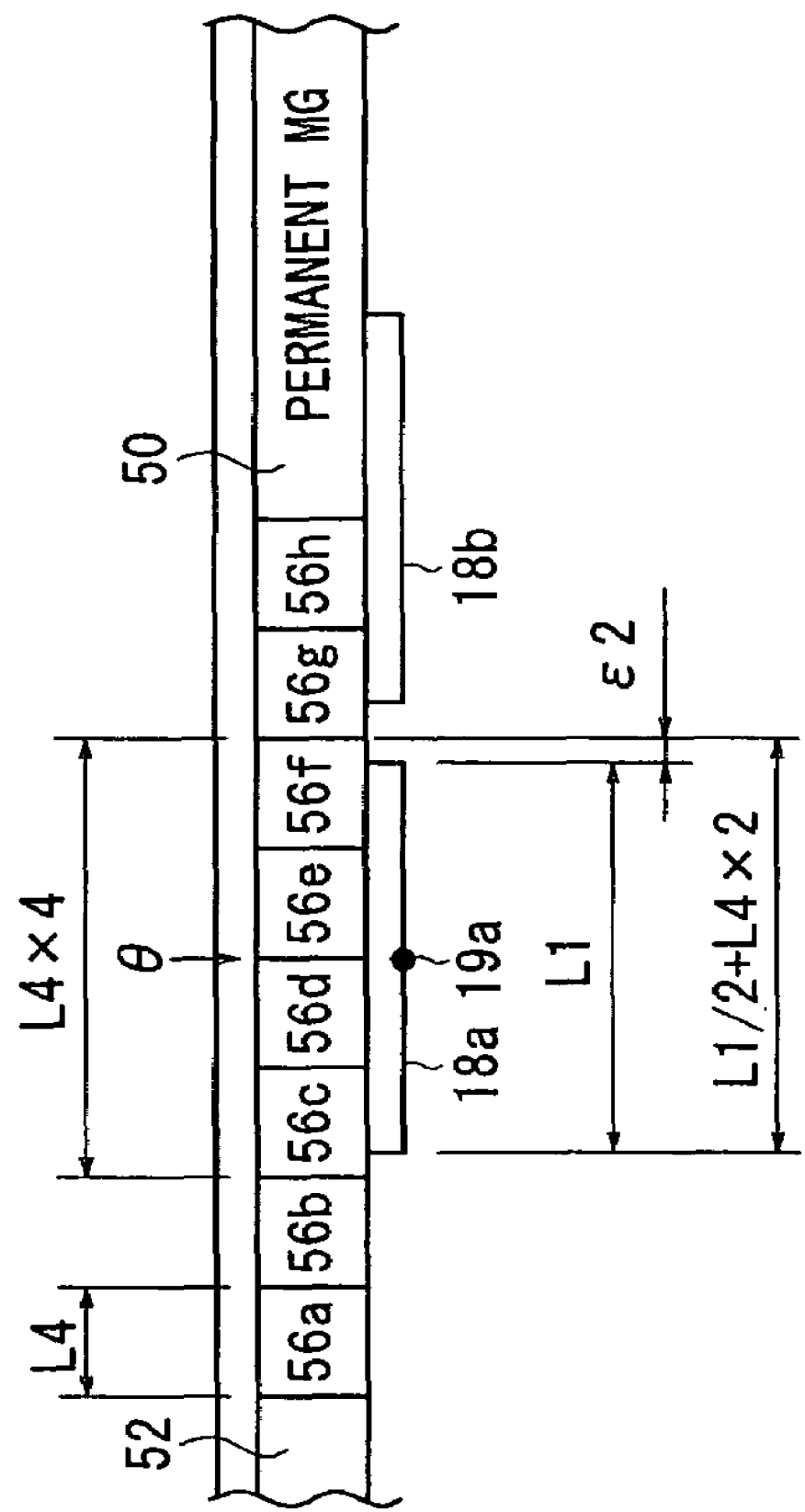

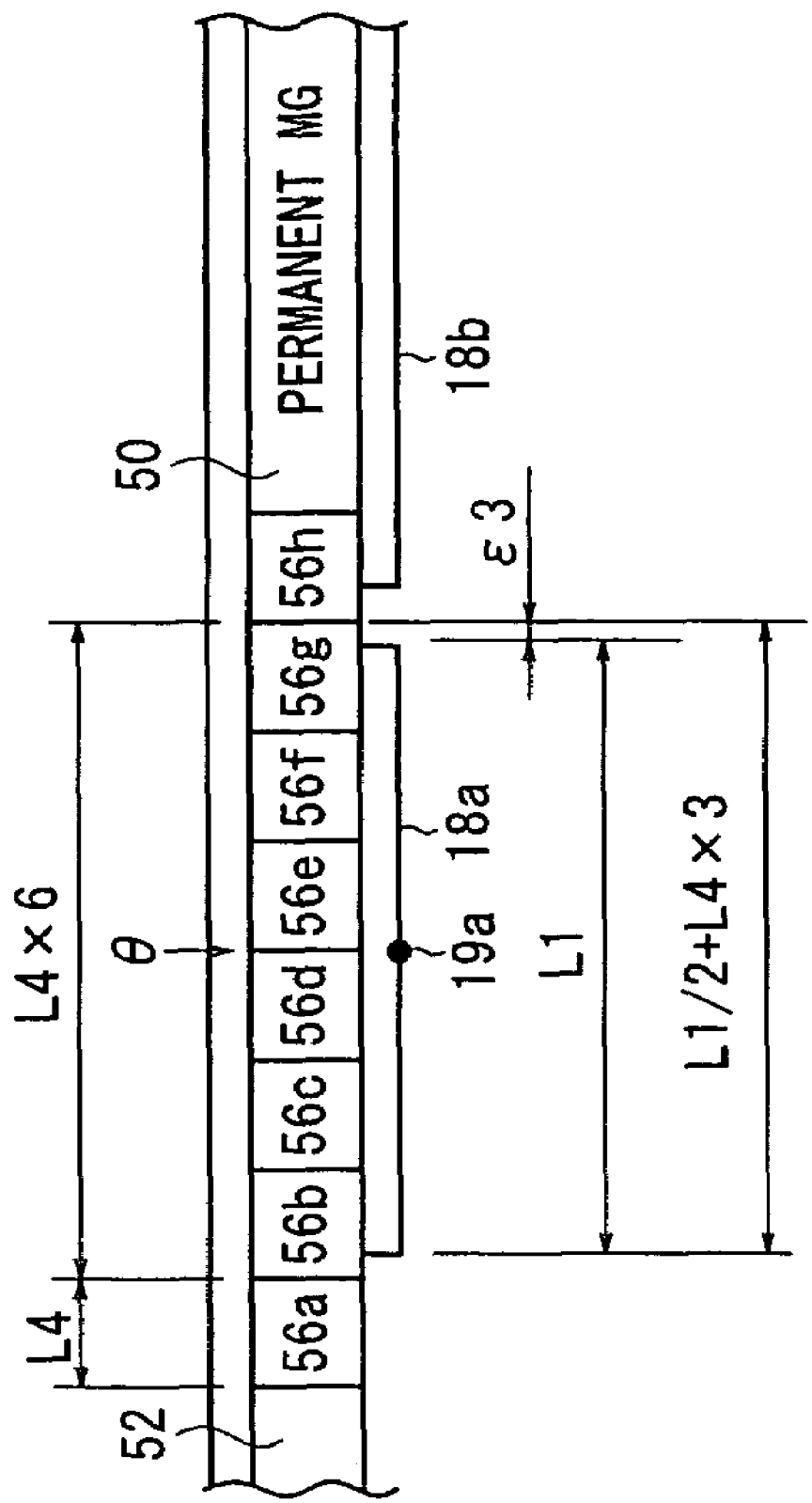

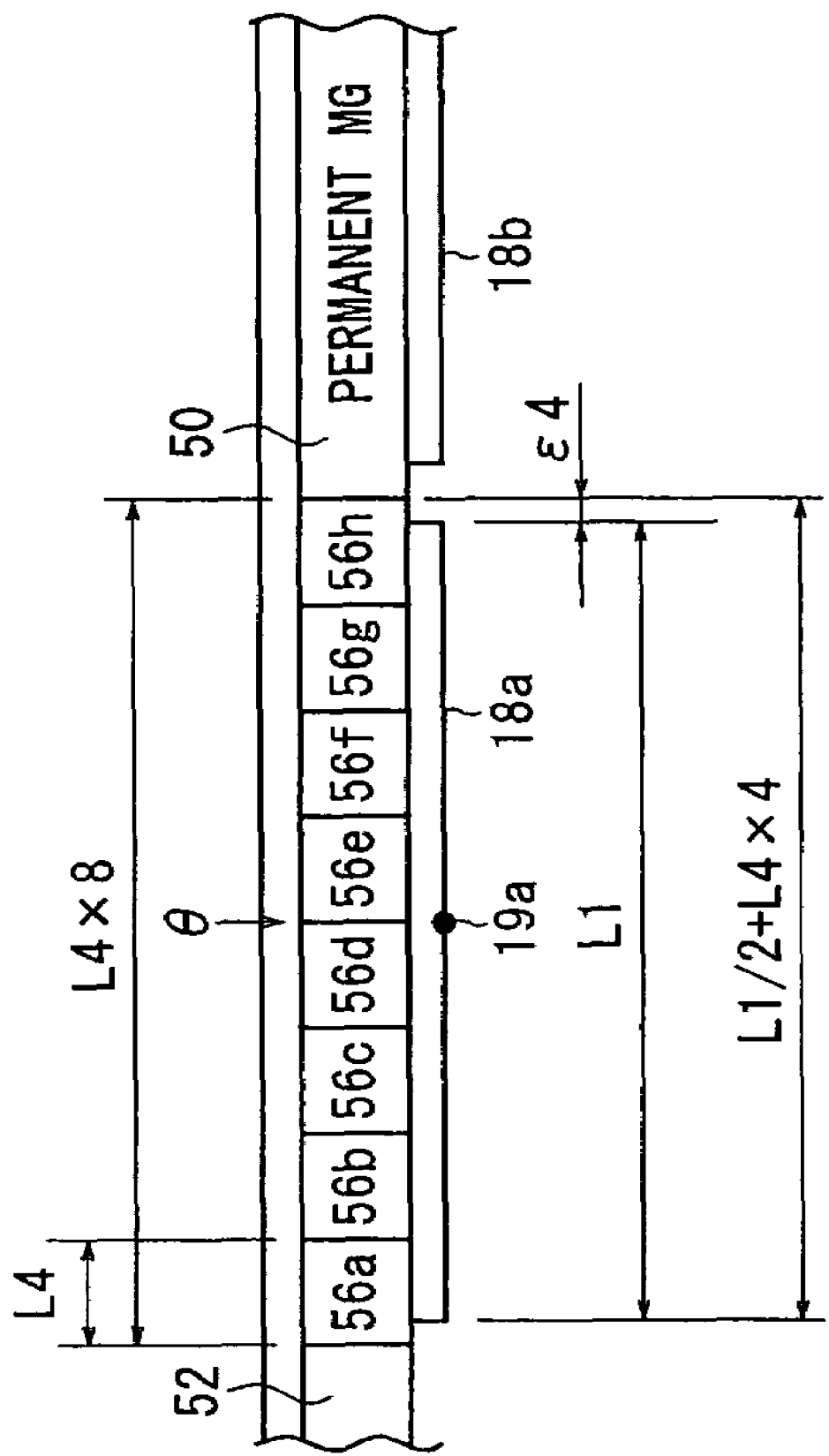

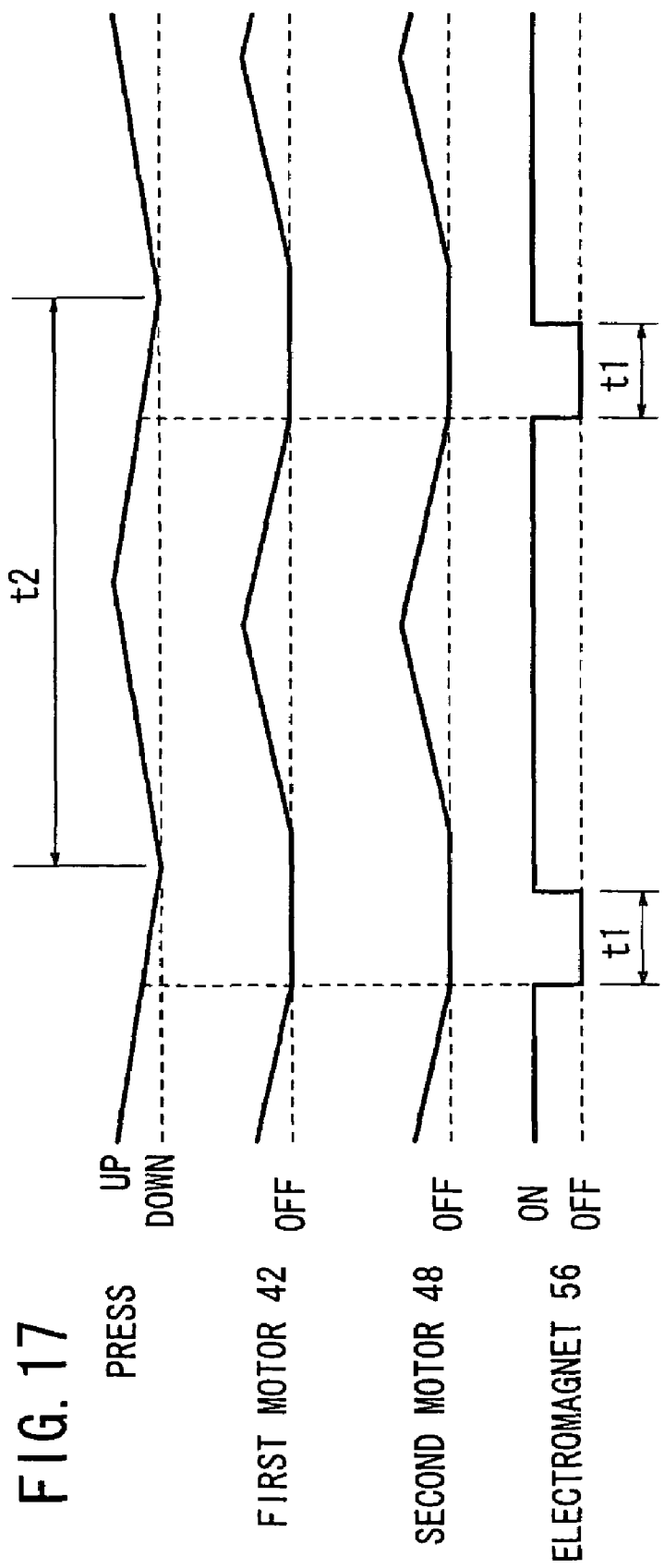

CONVEYOR SYSTEM AND METHOD OF SETTING OPERATION THEREOF

BACKGROUND OF THE INVENTION

1. Field of the Invention

The present invention relates to a conveyor system having a conveyor for conveying a sheet made of a magnetic material which is supplied from an apparatus in a preceding process, to a stacker while attracting the sheet to a belt with a plurality of magnets, and dropping the sheet onto the stacker, and a method of setting operation of such a conveyor system.

2. Description of the Related Art

There has been proposed a technology for conveying a magnetic workpiece such as a steel sheet while magnetically attracting the magnetic workpiece with magnets that are combined with a conveyor (see, for example, Japanese Laid-Open Patent Publication No. 8-295233). Specifically, a number of electromagnets are used as the magnets, and some of the electromagnets are energized to hold and convey the magnetic workpiece. When the magnetic workpiece reaches a stacking area, those electromagnets are de-energized to eliminate attractive forces, dropping the magnetic workpiece onto magnetic workpieces that have been stacked in the stacking area.

Sheets such as steel sheets are conveyed by a conveyor that is combined with electromagnets. If sheets of many different sizes are to be conveyed, then complex calculations are required to set timings to energize and de-energize the electromagnets and intervals at which the sheets are to be conveyed. Specifically, for operating the conveyor, the operator of the conveyor needs to perform complex calculations to set a number of parameters and enter the parameters into a controller of the conveyor. Since such a process is time-consuming, it poses an undue burden on the operator.

To avoid the complex calculations, it is customary for the operator to enter operational data based on the experience and correct the operational data on a trial-and-error basis in several trial runs of the conveyor system. However, this process requires the operator to have a plenty of experience, and may not necessarily be effective to produce appropriate operational settings.

SUMMARY OF THE INVENTION

It is therefore an object of the present invention to provide a conveyor system which is applicable to sheets of various sizes and is able to make operational settings through a simple process, and method of setting operation of such a conveyor system.

A conveyor system according to the present invention includes a conveyor for conveying a sheet made of a magnetic material, which is supplied from an apparatus in a preceding process, to a stacking area while attracting the sheet to a belt with a plurality of electromagnets, and dropping the sheet onto the stacking area, an input unit for entering sheet information including at least information as to the length of the sheet and another information as to the position where the sheet is loaded from the apparatus in the preceding process, an operating condition setting unit for setting operating condition data including at least a conveyor feed length representative of a feed cycle of the sheet on the conveyor and the number of sheets on the conveyor, based on the sheet information, and an operation controller for operating the conveyor based on the operation condition data.

By automatically setting operation of the conveyor system based on the length of the sheet and the position where the sheet is loaded from the apparatus in the preceding process, the conveyor system can intermittently convey sheets of various different sizes. Furthermore, the conveyor system is capable of making operational settings through a simple process.

The operating condition setting unit may perform branching based on the length of the sheet and a unit length of the electromagnets, and set the operation condition data in each branched sequence. With this arrangement, an appropriate conveyor feed length and the number of sheets can be determined depending on the length of the sheet and the unit length of the electromagnets.

The apparatus in the preceding process may comprise a press for cutting off the sheet from a steel sheet. The input unit may comprise a touch-panel monitor. The stacking area may be vertically movable by a lifting/lowering unit over a distance depending on the number of sheets stacked thereon.

The operation condition data may include information for selecting a dropping electromagnet to be de-energized to drop the sheet onto the stacker, from the electromagnets.

According to the present invention, there is also provided a method of setting operation of a conveyor system including a conveyor for conveying a sheet made of a magnetic material, which is supplied from an apparatus in a preceding process, to a stacking area while attracting the sheet to a belt with a plurality of electromagnets, and dropping the sheet onto the stacking area, the method comprising the steps of entering sheet information including at least information as to the length of the sheet and another information as to the position where the sheet is loaded from the apparatus in the preceding process, and automatically determining operating condition data including at least a conveyor feed length representative of a feed cycle of the sheet on the conveyor and the number of sheets on the conveyor, based on the sheet information, through programmed operation of a computer.

By automatically setting operation of the conveyor system based on the length of the sheet and the position where the sheet is loaded from the apparatus in the preceding process, the method allows the conveyor system to intermittently convey sheets of various different sizes. Furthermore, the method is capable of making operational settings through a simple process.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14 is a conceptual view showing a process of determining a sheet feed length when the length of a sheet is smaller than the length of four electromagnets;

FIG. 15 is a conceptual view showing a process of determining a sheet feed length when the length of a sheet is smaller than the length of six electromagnets;

FIG. 16 is a conceptual view showing a process of determining a sheet feed length when the length of a sheet is greater than the length of six electromagnets; and FIG. 17 is a timing chart of operational sequences of major devices of the conveyor system.

DESCRIPTION OF THE PREFERRED EMBODIMENT

A conveyor system according to an embodiment of the present invention and a method of setting operation of the conveyor system will be described below with reference to FIGS. 1 through 17.

Figure 1:
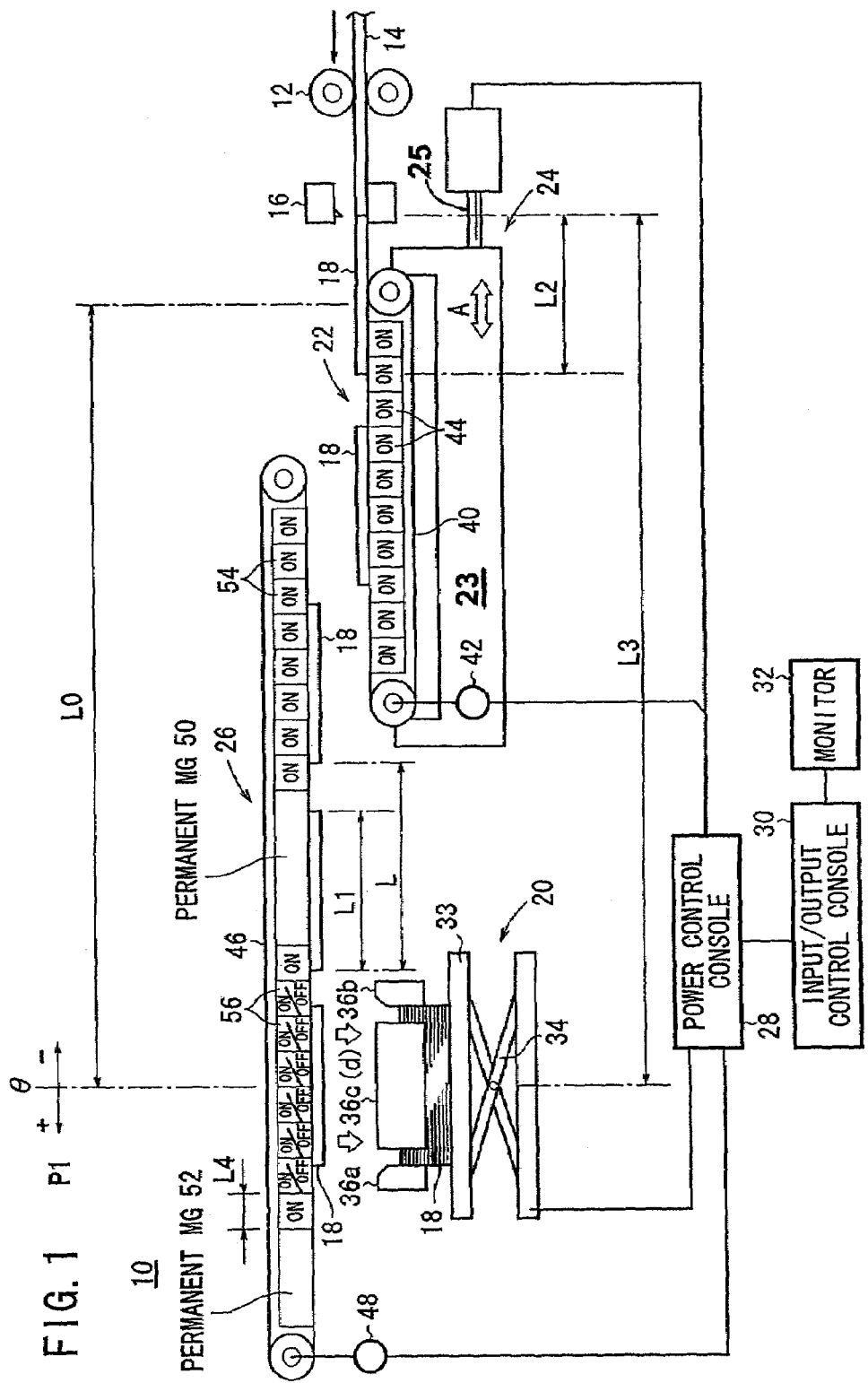
FIG. 1 is a schematic view of a conveyor system according to an embodiment of the present invention.

As shown in FIG. 1, a conveyor system 10 according to an embodiment of the present invention is of the magnetically attractive type, and serves to convey sheets 18 to a piling device 20 and stack them on the piling device 20. The sheets 18 are successively produced from an elongate steel sheet 14 supplied by rollers 12 when the elongate steel sheet 14 is cut off by a press 16. The method of setting operation of the conveyor system 10 sets operation thereof to convey sheets 18 having various sizes and shapes.

The sheets 18 are flat planar members and include those having concave and/or convex shapes in a portion thereof.

The conveyor system 10 has a first conveyor 22 for conveying a sheet 18 that has been cut off from the elongate steel sheet 14 to a predetermined size by the press 16, a position movement unit 24 for adjustably moving the position of the first conveyor 22 in back-and-forth directions (hereinafter referred to as "directions A"), a second conveyor 26 for receiving a sheet 18 conveyed by the first conveyor 22 and conveying the received sheet 18 to the piling device 20, a power control console 28 for controlling operation of various devices of the conveyor system 10, an input/output control console (or an operating condition setting unit) 30 connected to the power control console 28 for processing various inputs and outputs and controlling the entire conveyor system 10, and a monitor (or an input unit) 32 connected to the input/output control console 30 and serving as a man-machine interface. It will be understood from a review of FIG. 1 that the first conveyor 22 includes a support base 23 which is slidably mounted to a substrate, with other components of the conveyor mounted on, and supported by, the support base 23. This support base 23 is selectively adjustably movable in the longitudinal directions shown by the arrow A in FIG. 1, by moving a connecting member 25 of the position movement unit 24, to slidably adjust the position of the first conveyor 22 in relation to the second conveyor 26.

The piling device 20 is a device for stacking sheets 18. The piling device 20 has a lifting/lowering unit 34 for vertically moving a stacker 33 depending on the number of sheets 18 that are stacked, and four aligning devices 36*a*, 36*b*, 36*c*, 36*d* for pressing stacked sheets 18 on their front, rear, left, and right edges under light forces to vertically align the sheets 18. The aligning devices 36*a*, 36*b*, 36*c*, 36*d* have respective actuators operable by cylinders (not shown) for positionally adjusting themselves depending on the size of sheets 18 to be stacked.

The first conveyor 22 itself is movable in the directions A by the position movement unit 24 under the control of the power control console 28. The first conveyor 22 can carry on its upper surface a sheet 18 that has been cut off from the elongate steel sheet 14 by the press 16 and convey the sheet 18 to a position beneath an end of the second conveyor 26.

The first conveyor 22 has a belt 40 for conveying a sheet 18, a first motor 42 for circulatively rotating the belt 40 counterclockwise in FIG. 1, and a number of electromagnets 44 arrayed beneath the upper run of the belt 40. The electromagnets 44 can individually be energized and de-energized by the power control console 28 through power supply lines (not shown). A sheet 18 which is supplied onto the belt 40 is attracted under magnetic forces to those electromagnets 44 which are energized, and is conveyed by the belt 40 rotated by the first motor 42. The first motor 42 is servo-controlled for its speed by the power control console 28, and can freely be turned on, turned off, and controlled to change its speed by the power control console 28.

The term "energized" used herein means an energized state of an electromagnet, and the term "de-energized" used herein means a de-energized state of an electromagnet.

The second conveyor 26 has a belt 46 for conveying a sheet 18, a second motor 48 for circulatively rotating the belt 46 clockwise in FIG. 1, and an elongate central magnet 50, an end magnet 52, a number of electromagnets 54, and eight electromagnets 56 which are disposed above the lower run of the belt 46. The central magnet 50 and the end magnet 52 are permanent magnets and represented as "PERMANENT MG" in the drawings. The electromagnets 54 are disposed above an end portion of the first conveyor 22. The eight electromagnets 56 are disposed above the piling device 20.

The central magnet 50 is disposed between the electromagnets 54 and the electromagnets 56, and the end magnet 52 is disposed at an end of the second conveyor 26. The eight electromagnets 56 are divided into four successive electromagnets 56 positioned forwardly of a piling center θ which serves as a reference position for dropping a sheet 18 onto the piling device 20, and four successive electromagnets 56 positioned rearwardly of the piling center θ.

The first motor 42 and the second motor 48 can repeatedly be turned on and off by the input/output control console 30 for intermittently operating the first conveyor 22 and the second conveyor 26, respectively, based on information representing a synchronous feed length L for a sheet 18 and the number M of sheets 18, etc. A method of setting operation based on the synchronous feed length L and the number M of sheets 18 will be described in detail later on.

The electromagnets 54, 56 can individually be energized and de-energized by the power control console 28 through power supply lines (not shown). A sheet 18 which is supplied onto the belt 46 is attracted under magnetic forces to those electromagnets 54 which are energized, the central magnet 50, and those electromagnets 56 which are energized, and is conveyed by the belt 46 rotated by the second motor 48, to a position above the piling device 20. When the sheet 18 is conveyed by the belt 46 to the position above the piling device 20, part of the electromagnets 56 are de-energized by the power control console 28 to eliminate the attractive forces, dropping the sheet 18 vertically onto the piling device 20. Sheets 18 that are stacked on the piling device 20 are pressed under light forces into a vertically aligned array by the aligning devices 36a, 36b, 36c, 36d.

When the conveyor system 10 operates in an inspection mode, a sheet 18 is conveyed to the end of the second conveyor 26 remote from the first conveyor 22. In this inspection mode, the eight electromagnets 56 remain energized, and the sheet 18 is conveyed to the end of the second conveyor 26 under magnetic forces from the end magnet 52.

Although not shown, there are four first conveyors 22 positioned in close juxtaposition, and four second conveyors 26 positioned in close juxtaposition. The outer two of the four first conveyors 22 are transversely slidable toward and away from the inner two of the four first conveyors 22. Similarly, the outer two of the four second conveyors 26 are transversely slidable toward and away from the inner two of the four second conveyors 26. The transversely slidable outer conveyors may be positionally adjusted depending on the width W of a sheet 18 to be conveyed.

Figure 2:
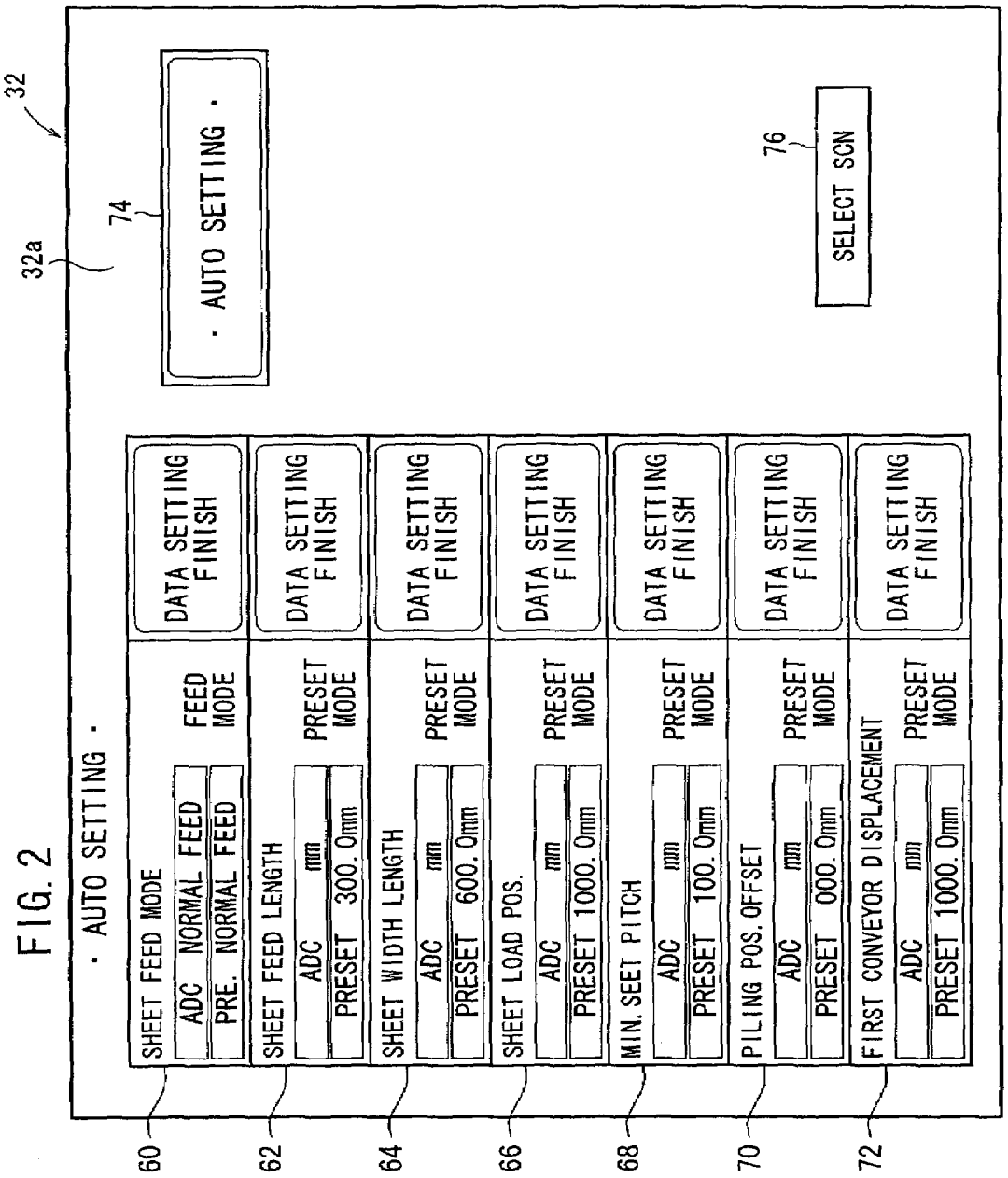
FIG. 2 is a view of a screen image displayed on a monitor.

As shown in FIG. 2, the monitor 32 comprises a display unit doubling as a touch-panel input unit for inputting and outputting various data. For example, the monitor 32 can display an screen 32a for entering operational settings prior to operation of the conveyor system 10. The displayed screen 32a displays a sheet feed mode setting area 60, a sheet feed length setting area 62, a sheet width length setting area 64, a sheet load position setting area 66, a minimum sheet pitch setting area 68, a piling position offset setting area 70, a first conveyor displacement setting area 72, and a setting decision command area 74. The operator can enter numeral values or modes into these setting areas, using a dedicated hardware ten-key pad or a ten-key pad displayed in the screen 32a. The screen 32a also displays a screen selector 76 for changing to another fault display screen. When an alarm lamp (not shown) is turned on, indicating a data fault, the operator chooses the screen selector 76 to go to the fault display screen for performing a fault processing procedure.

The sheet feed mode setting area 60 is an area for setting a mode for feeding a sheet 18. Usually, "NORMAL FEED" is set.

The sheet feed length setting area 62 and the sheet width length setting area 64 are areas for setting a length L1 (see FIG. 1) in the feed direction of a sheet 18 and a width W thereof.

The sheet load position setting area 66 is an area for setting a distance L2 (see FIG. 1) over which a sheet 18 cut off by the press 16 is received by the first conveyor 22.

The minimum sheet pitch setting area 68 is an area for setting a minimum distance P2 between sheets 18 during conveyance thereof. The minimum distance P2 is automatically set to an initial value of 100 mm by an action on the minimum sheet pitch setting area 68.

The piling position offset setting area 70 is an area for setting, as an offset P1 (see FIG. 1), a position where a sheet 18 is to be actually dropped vertically onto the piling device 20, with respect to the piling center θ. Usually, the offset P1 is set to "000.0".

The first conveyor displacement setting area 72 is an area for setting a position to which the first conveyor 22 is to be moved by the position movement unit 24.

After numerical values and modes are entered in the above setting areas 60, 62, 64, 66, 68, 70, and 72, the operator touches the displayed button in the setting decision command area 74 to finally determine the entered data. Those of the above data other than the length L1 in the feed direction of a sheet 18 and the distance L2 over which a sheet 18 is received by the first conveyor 22 are data that are usually not required to be changed or can automatically be set. Therefore, the operator may manually enter a length L1 and a distance L2 only.

Figure 3:
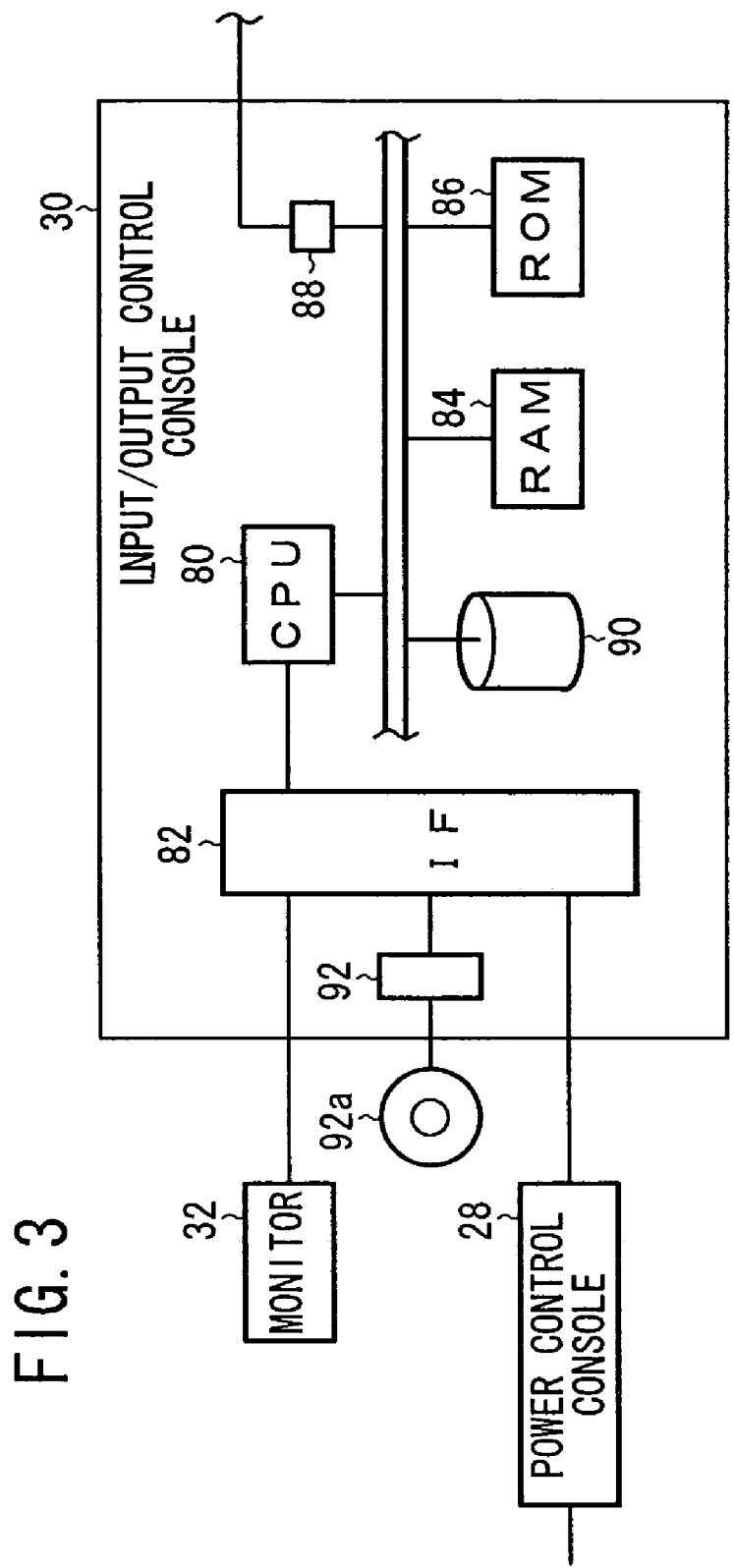
FIG. 3 is a block diagram of an input/output control console.

As shown in FIG. 3, the input/output control console 30 can automatically set and record various data required to operate the conveyor system 10 based on the data entered from the monitor 32, and can control the conveyor system 10 in coaction with the power control console 28 using the automatically set data. The input/output control console 30 has a CPU (Central Processing Unit) 80 as a control means, an input/output interface (IF) 82, a RAM (Random Access Memory) 84 and a ROM (Read Only Memory) 86 as recording means, a communication unit 88 for communicating with an external computer or the like, an internal recording unit 90 such as a hard disk or the like, and a driver 92 for using an external recording medium 92a. The CPU 80 reads a predetermined program from the internal recording unit 90 or the external recording medium 92a, and performs a processing sequence in coaction with the RAM 84, the ROM 86, and the input/output interface 82. The input/output control console 30 can display certain operational data on the monitor 32 while the conveyor system 10 is in operation.

A process of setting operation of the conveyor system 10 thus constructed and conveying a sheet 18 with the conveyor system 10 will be described below with reference to FIGS. 4 through 17.

Figure 4:
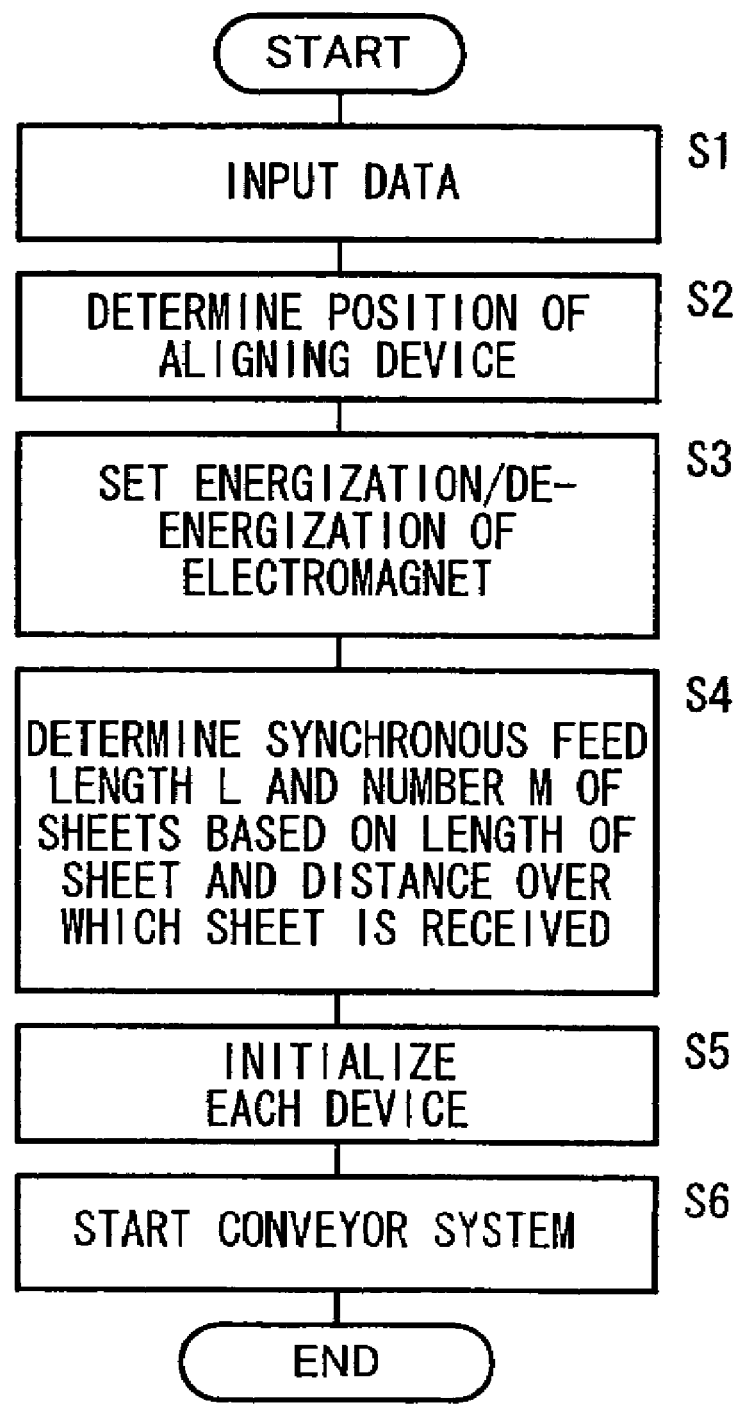
FIG. 4 is a flowchart of a method of setting operation of the conveyor system according to the embodiment of the present invention.

In step S1 shown in FIG. 4, the screen 32a (see FIG. 2) is displayed on the monitor 32, and the operator enters various data on the screen 32a. Of these data, the mode for feeding a sheet 18, the offset P1, and the minimum distance P2 between sheets 18 are set to initial values, i.e., "NORMAL FEED", 0 mm, and 100 mm, respectively. Thereafter, the operator touches the displayed button in the setting decision command area 74 to finally determine the entered data. The determined data are stored in a predetermined recording area.

In step S2, the CPU 80 operates according to the predetermined program to determine and record appropriate positions of the aligning devices 36a through 36d primarily based on the length L1 and the width W of the sheet 18 and the offset P1 of the entered data. Based on these data, the CPU 80 determines and records appropriate positions of the outer two of the four first conveyors 22 and the outer two of the four second conveyors 26. Basically, step S2 and subsequent steps are automatically performed by the CPU 80 in coaction with the RAM 84, etc. according to the predetermined program which is read from the internal recording unit 90 by the CPU 80.

In step S3, the electromagnets 56 of the second conveyor 26 are energized and de-energized based on the length L1 of the sheet 18 and the distance L2, and corresponding data are recorded. Details of step S3 will be described later.

In step S4, synchronous feed lengths L in the first conveyor 22 and the second conveyor 26, and the number M of sheets 18 are determined and recorded based on the length L1 of the sheet 18, the distance L2, and the data recorded in step S3. Details of step S4 will be described later.

Although not shown in FIG. 4, in the event of a fault of the data entered and determined in steps S1 through S4, the CPU 80 performs a fault process to turn on the alarm lamp and displays the screen 32a (see FIG. 2) again to prompt the operator to enter some data again. The operator may choose the screen selector 76 to go to the fault display screen for performing the fault processing procedure.

In step S5, the conveyor system 10 is mechanically initialized. Specifically, the position movement unit 24 is operated based on the data set in the first conveyor displacement setting area 72 (see FIG. 2) to move the first conveyor 22 to an appropriate position. The aligning devices 36a through 36d, the outer two of the first conveyors 22, and the outer two of the second conveyors 26 are moved to respective appropriate positions based on the data determined in step S2.

In step S6, the conveyor system 10 starts operating based on the set data.

Details of the processing in step S3 will be described below with reference to FIGS. 5 through 10. A conveyor feed length representative of a feed cycle for sheets 18 on the first and second conveyors 22, 26 is represented by L (see FIG. 1), the number of sheets 18 on the first and second conveyors 22, 26 by M, and the length of each of the electromagnets 44, 54, 56 by L4. The length L4 is greater than the minimum interval P2, and may be 500 mm, for example.

The length L1 in the feed direction of a sheet 18 and the distance L2 over which a sheet 18 cut off by the press 16 is received by the first conveyor 22 are also simply referred to as L1, L2, respectively.

In steps S101 through S103, branching is performed based on L1, L4. Specifically, in step 101, it is determined whether L1+P2<L4×2 or not. If this condition is satisfied, then control goes to step S104. If L1+P2≧L4×2, then control goes to step S102.

In step 102, it is determined whether L1+P2<L4×4 or not. If this condition is satisfied, then control goes to step S106. If L1+P2≧L4×4, then control goes to step S103.

In step 103, it is determined whether L1+P2<L4×6. If this condition is satisfied, then control goes to step S110. If L1+P2≧L4×6, then control goes to step S114. It is assumed that L1≦L4×8−P2.

Figure 6:
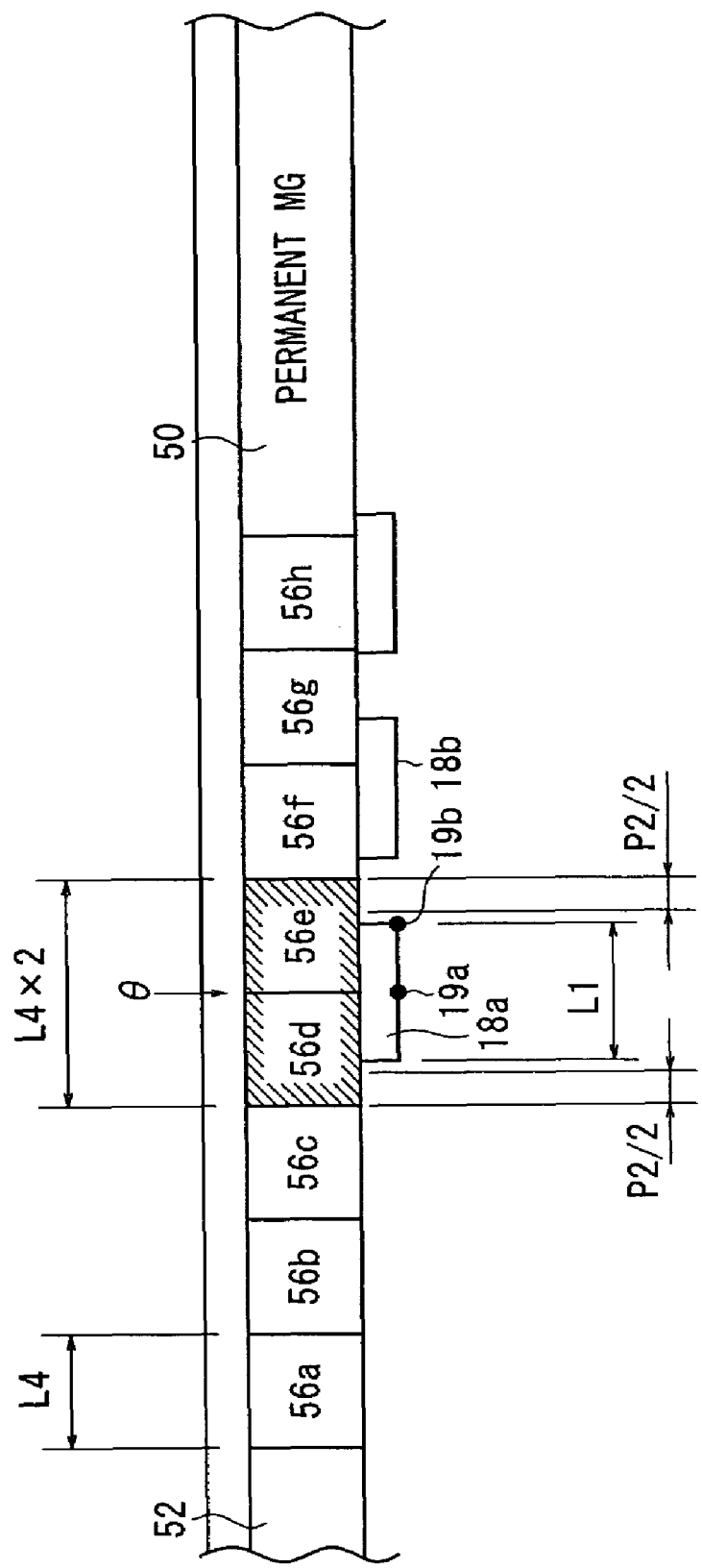
FIG. 6 is a conceptual view showing a process of setting the number of electromagnets to be de-energized when the length of a sheet including a minimum interval P2 is smaller than the length of two electromagnets.

In step S104, i.e., if L1+P2<L4×2, the number of electromagnets 56 to be de-energized for dropping a sheet 18 is set to 2 across the piling center θ. Specifically, as shown in FIG. 6, it is assumed that the eight electromagnets 56 are distinguished as electromagnets 56a, 56b, 56c, 56d, 56e, 56f, 56g, 56h successively from the downstream end, and the second conveyor 26 is operated with the electromagnets 56d, 56e being switched from an energized state to a de-energized state and the other electromagnets 56a, 56b, 56c, 56f, 56g, 56h remaining energized. In FIGS. 6 through 10, those electromagnets 56 (or dropping electromagnets) which are to be de-energized for dropping a sheet 18 are shown hatched.

When the center 19a of a leading sheet 18a of a plurality of sheets 18 to be fed reaches the position of the piling center θ, the electromagnets 56d, 56e are de-energized, allowing the sheet 18a to fall reliably, without being skewed, onto the piling device 20. Since the condition of L1+P2<L4×2 is satisfied, at least a distance of P2/2 is present between the leading end of the sheet 18 and the downstream end of the electromagnet 56d and a distance of P2/2 is present between the trailing end of the sheet 18 and the upstream end of the electromagnet 56d. Accordingly, even if the sheet 18a as it is fed is displaced out of position, the sheet 18a can reliably be dropped without being adversely affected by the magnetic forces from the adjacent electromagnet 56c or 56f.

Inasmuch as the adjacent electromagnet 56f remains energized, it is possible to keep the next sheet 18b up to the position of the electromagnet 56f while the next sheet 18b is being conveyed. Therefore, the distance between the sheets 18a, 18b can be reduced for an increased feeding efficiency.

In step S105, P3 is set to P2 (P3←P2). P3 is a parameter used in step S3 as a reference value for determining the distance up to the sheet 18b from an end 19b of the sheet 18a.

Figure 7:
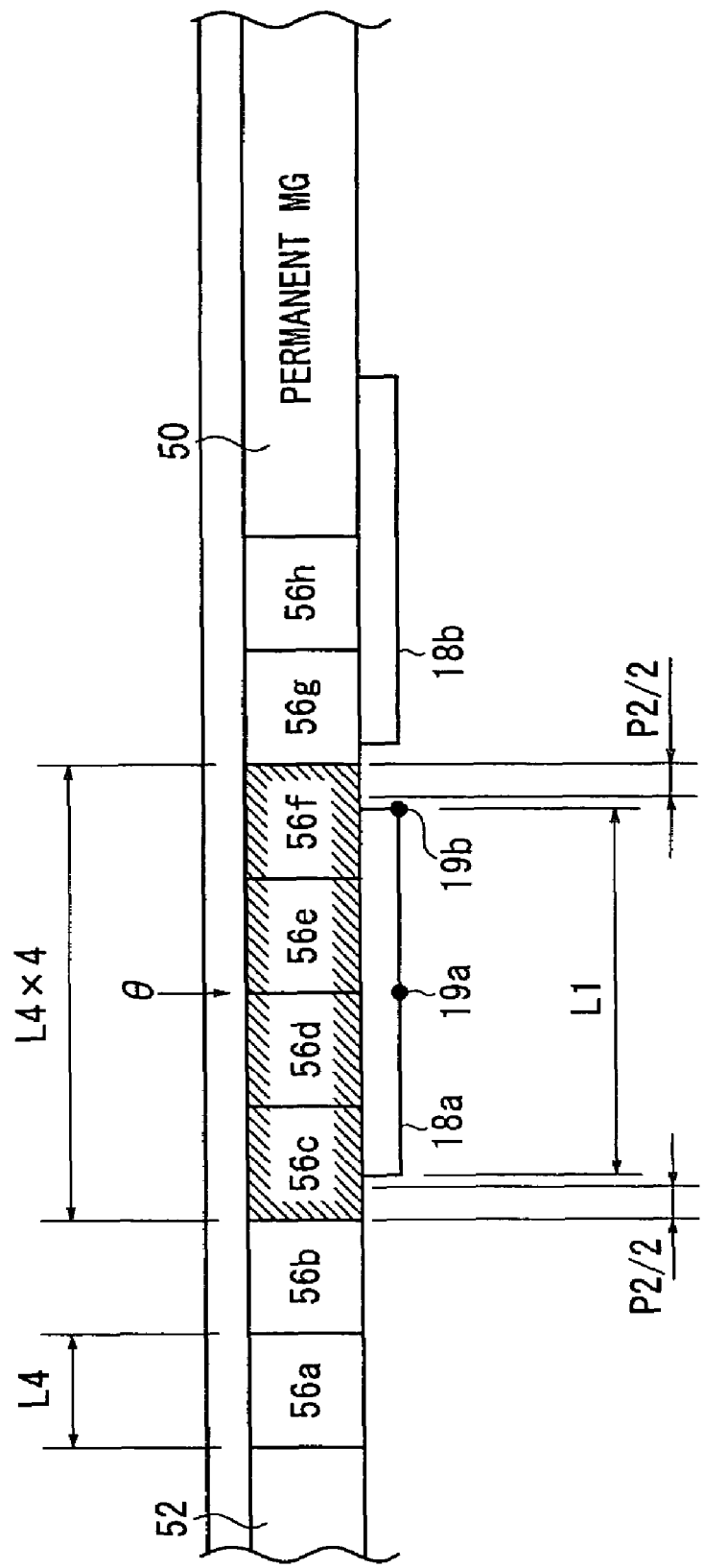
FIG. 7 is a conceptual view showing a process of setting the number of electromagnets to be de-energized when the length of a sheet including a minimum interval P2 is smaller than the length of four electromagnets.

In step S106, i.e., if L1+P2<L4×4, the number of electromagnets 56 to be de-energized for dropping a sheet 18 is set to 4 across the piling center θ. Specifically, as shown in FIG. 7, the second conveyor 26 is operated with the electromagnets 56c, 56d, 56e, 56f being switched from an energized state to a de-energized state and the other electromagnets 56a, 56b, 56g, 56h remaining energized.

In step S107, it is determined whether L1<L4×2. If this condition is satisfied, then control goes to step S108. If L1≧L4×2, then control goes to step S109.

In step S108, i.e., if L4×2−P2≦L1<L4×2, P3 is set to P2+L4 (P3←P2+L4).

Figure 8:
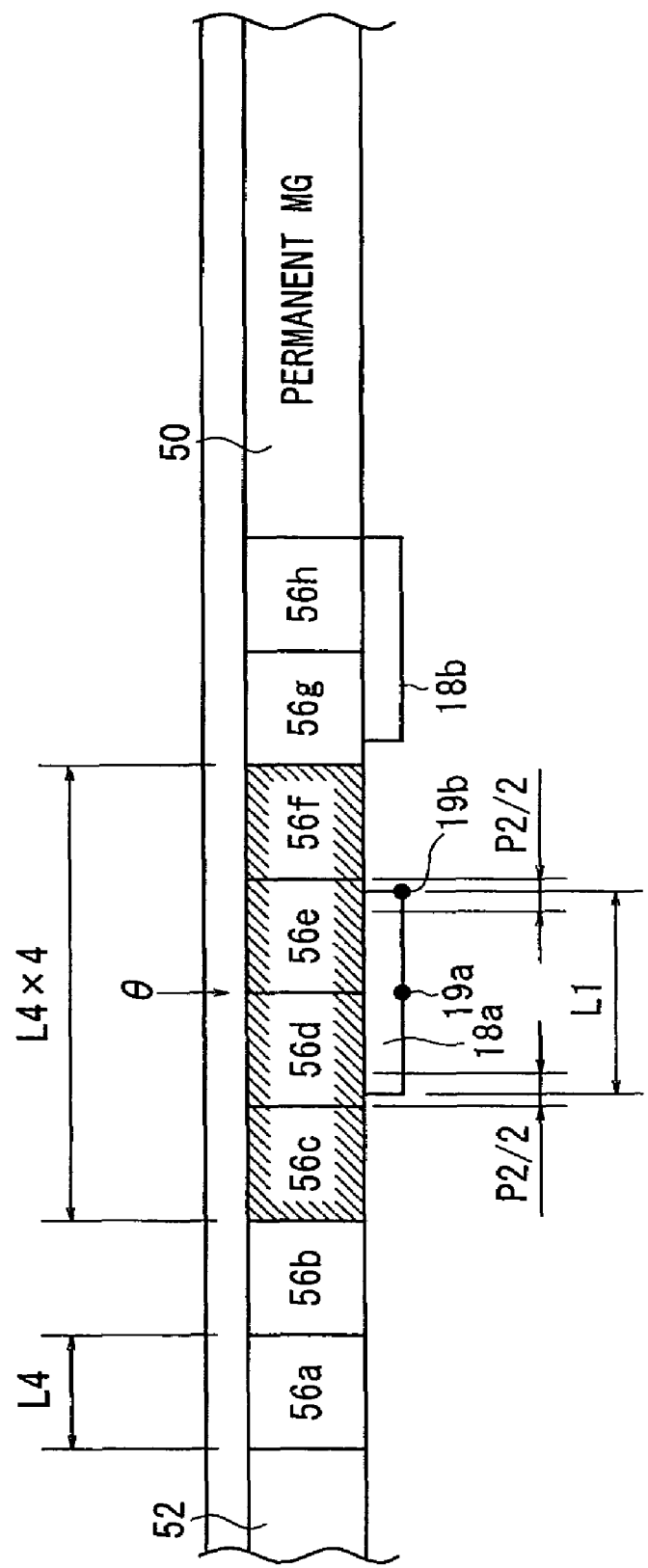
FIG. 8 is a conceptual view showing a process of setting the number of electromagnets to be de-energized when the length of a sheet including a minimum interval P2 is smaller than the length of four electromagnets and, in particular, is substantially equal to the length of two electromagnets.

As shown in FIG. 8, L1, which represents the length of the sheet 18a, is smaller than, but approximately equal to, twice the length L4 of each electromagnet 56. Even if the sheet 18a as it is fed is displaced out of position, the central electromagnets 56d, 56e and the electromagnets 56c, 56f on both sides of the central electromagnets 56d, 56e are de-energized in step S106 to allow the sheet 18a to drop reliably. At this time, the next sheet 18b should not enter the area of the electromagnet 56f that is de-energized, but needs to be kept in the area of the electromagnet 56g. Therefore, P3, which is a reference value for determining the interval between sheets 18b, is determined by adding L4, which represents the length of each electromagnet 56, to the minimum interval P2 to keep an appropriate interval between sheets 18b.

In step S109, P3 is set to P2 (P3←P2). At this time, the sheet 18a is present in the area of the four electromagnets 56c through 56f, with the end 19b of the sheet 18a being present in the area of the electromagnet 56f. Consequently, the next sheet 18b can enter the area of the electromagnet 56g, and does not need to be retracted to the area of the electromagnet 56h. Thus, L4, which represents the length of each electromagnet 56, is not added to the reference value P3, but the minimum interval P2 is directly used as the reference value P3.

Figure 9:
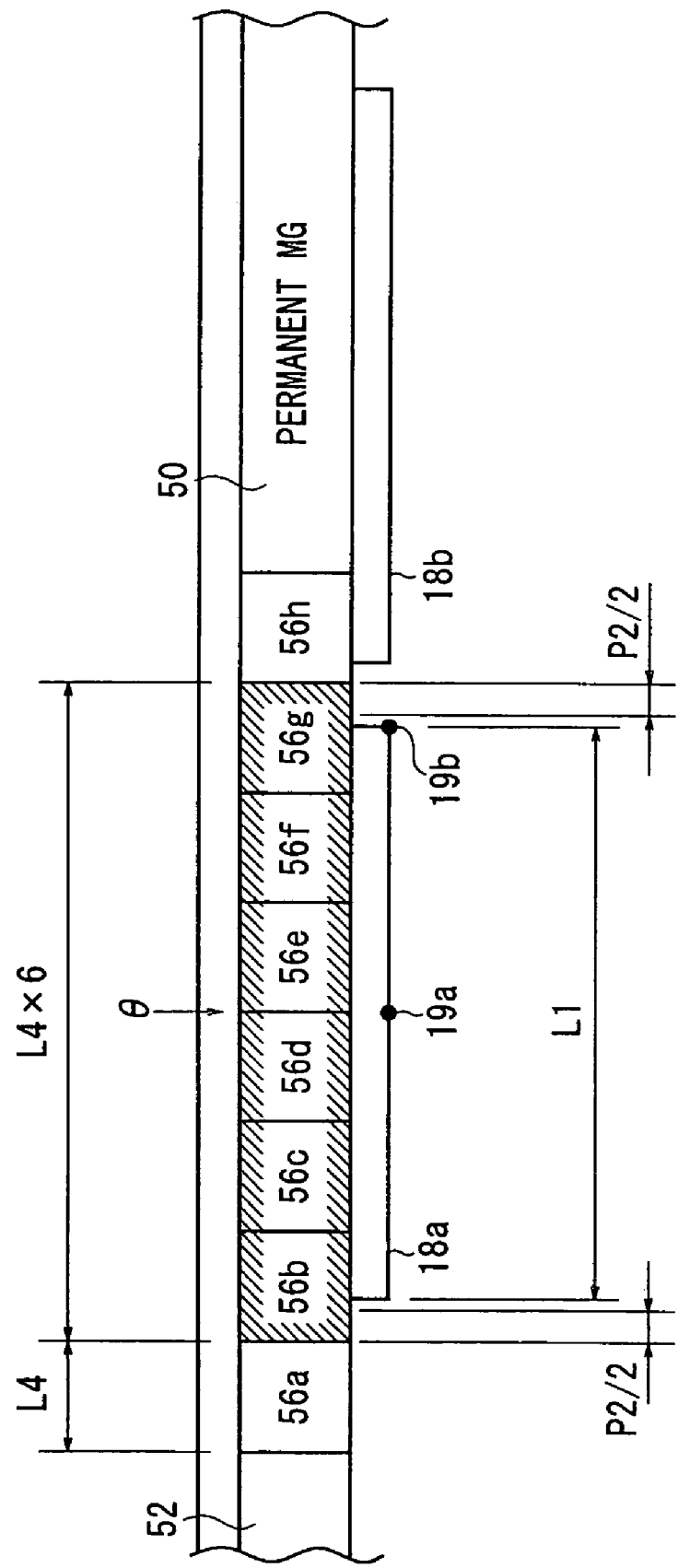
FIG. 9 is a conceptual view showing a process of setting the number of electromagnets to be de-energized when the length of a sheet including a minimum interval P2 is smaller than the length of six electromagnets.

In step S110, i.e., if L1+P2<L4×6, the number of electromagnets 56 to be de-energized for dropping a sheet 18 is set to 6 across the piling center θ. Specifically, as shown in FIG. 9, the second conveyor 26 is operated with the electromagnets 56b, 56c, 56d, 56e, 56f, 56g being switched from an energized state to a de-energized state and the other electromagnets 56a, 56h remaining energized.

In step S111, it is determined whether L1<L4×4. If this condition is satisfied, then control goes to step S112. If L1≧L4×4, then control goes to step S113.

In step S112, i.e., if L4×4−P2≦L1<L4×4, P3 is set to P2+L4 (P3←P2+L4). By adding L4 to P2, the same advantages as described above in step S108 are achieved.

In step S113, P3 is set to P2 (P3←P2).

Figure 10:
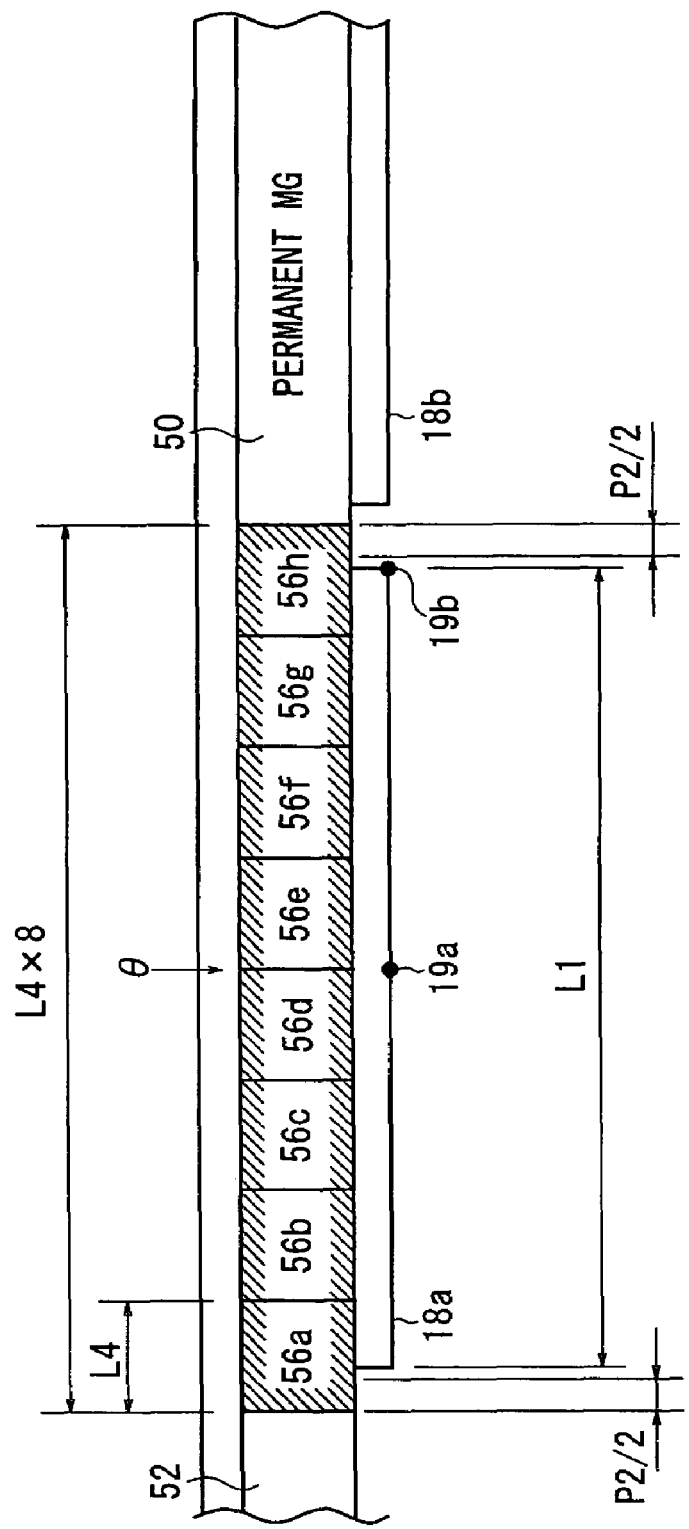
FIG. 10 is a conceptual view showing a process of setting the number of electromagnets to be de-energized when the length of a sheet including a minimum interval P2 is greater than the length of six electromagnets.

In step S114, i.e., if L4×6−P2≦L1<L4×8, as shown in FIG. 10, the second conveyor 26 is operated with all the eight electromagnets 56a through 56h being switched from an energized state to a de-energized state to drop the sheet 18.

In step S115, P3 is set to P2 (P3←P2).

Figure 5:
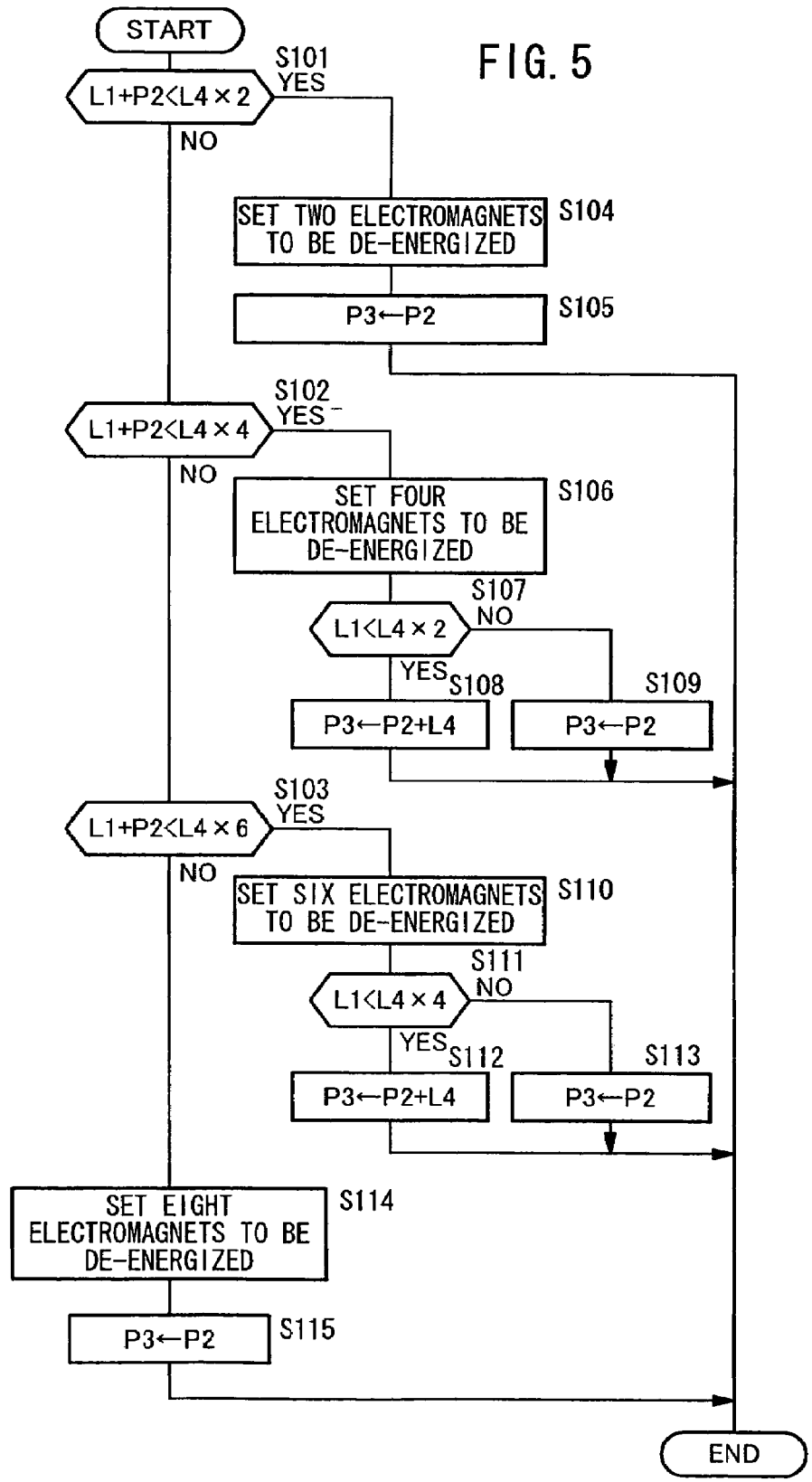
FIG. 5 is a flowchart of a process of setting the number of electromagnets to be de-energized.

After steps S105, S108, S109, S112, S113, and S115, the process shown in FIG. 5 is put to an end.

In steps S104, S106, S110, and S114, the numbers of electromagnets 56 to be de-energized are different, i.e., 2, 4, 6, and 8, respectively. In these steps, the same advantages as described above in step S104 are achieved with respect to the dropping of the sheet 18a.

Details of step S4 will be described below with reference to FIGS. 11 through 16.

Figure 11:
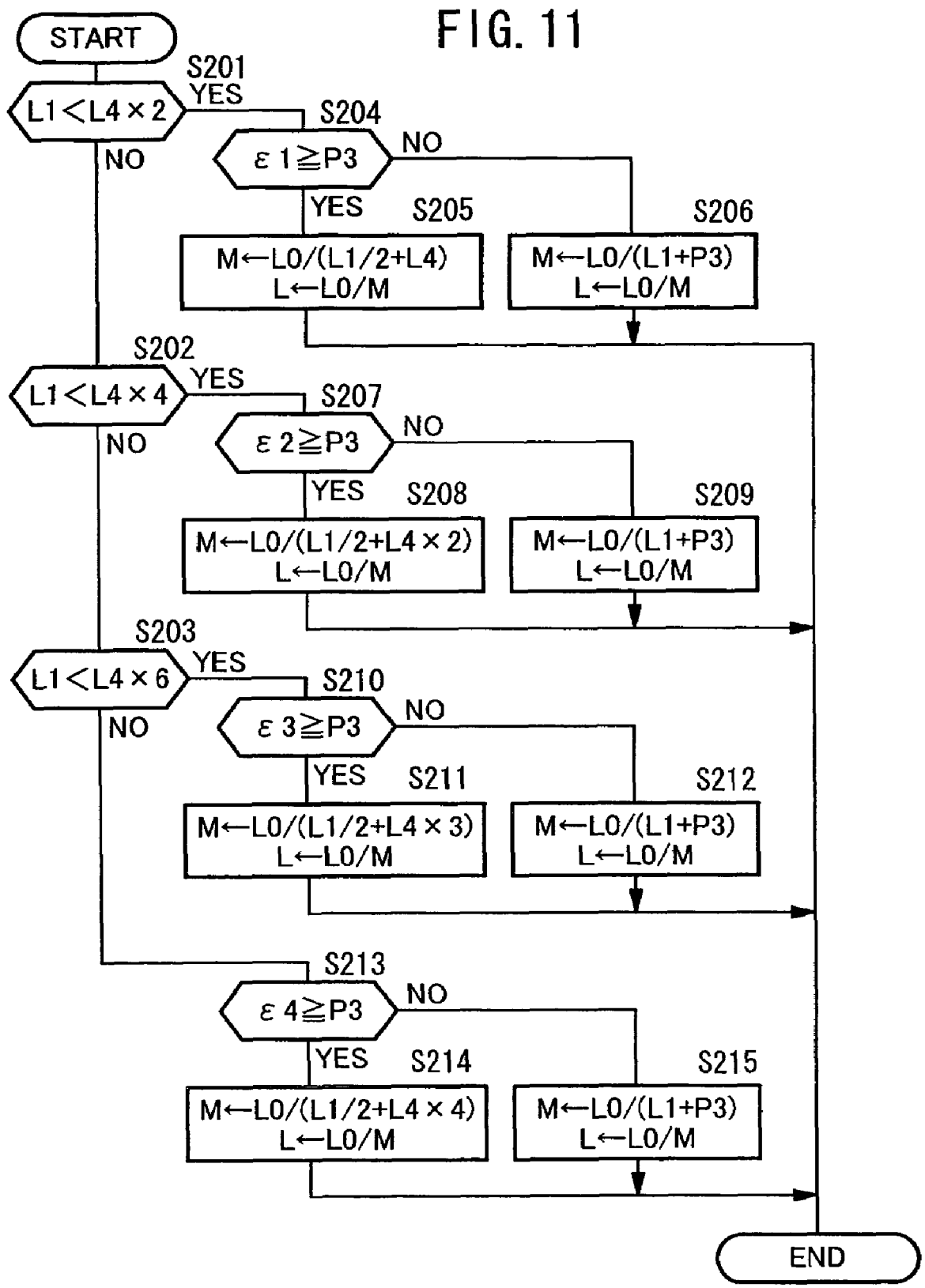
FIG. 11 is a flowchart of a process of determining a sheet feed length and the number of sheets.

In steps S201 through S203 shown in FIG. 11, branching is performed based on L1, L4. Specifically, in step 201, it is determined whether L1<L4×2. If this condition is satisfied, then control goes to step S204. If L1≧L4×2, then control goes to step S202.

In step 202, it is determined whether L1<L4×4. If this condition is satisfied, then control goes to step S207. If L1≧L4×4, then control goes to step S203.

In step 203, it is determined whether L1<L4×6. If this condition is satisfied, then control goes to step S210. If L1≧L4×6, then control goes to step S213.

In step S204, i.e., if L1<L4×2, it is determined whether $\epsilon1≧P3$. $\epsilon1=L1/2+L4−L1$ (see FIG. 12) and represents the interval between the trailing end of the sheet 18a and the upstream end of the electromagnet 56e which is attracting the trailing end of the sheet 18a when the center 19a of the sheet 18a reaches the piling center θ. If this condition is satisfied, then control goes to step S205. If $\epsilon1<P3$, then control goes to step S206.

In step S205, M is determined according to M←L0/(L1/2+L4). Since M represents the number of sheets 18, any fractional part is truncated in order to make M an integer. L0=L3+L1/2−L2+P1 (see FIG. 1) and represents the total distance over which a sheet 18 is to be fed. L3 represents the distance from the press 16 to the piling device 20. After M is determined, L is determined according to L←L0/M.

Figure 12:
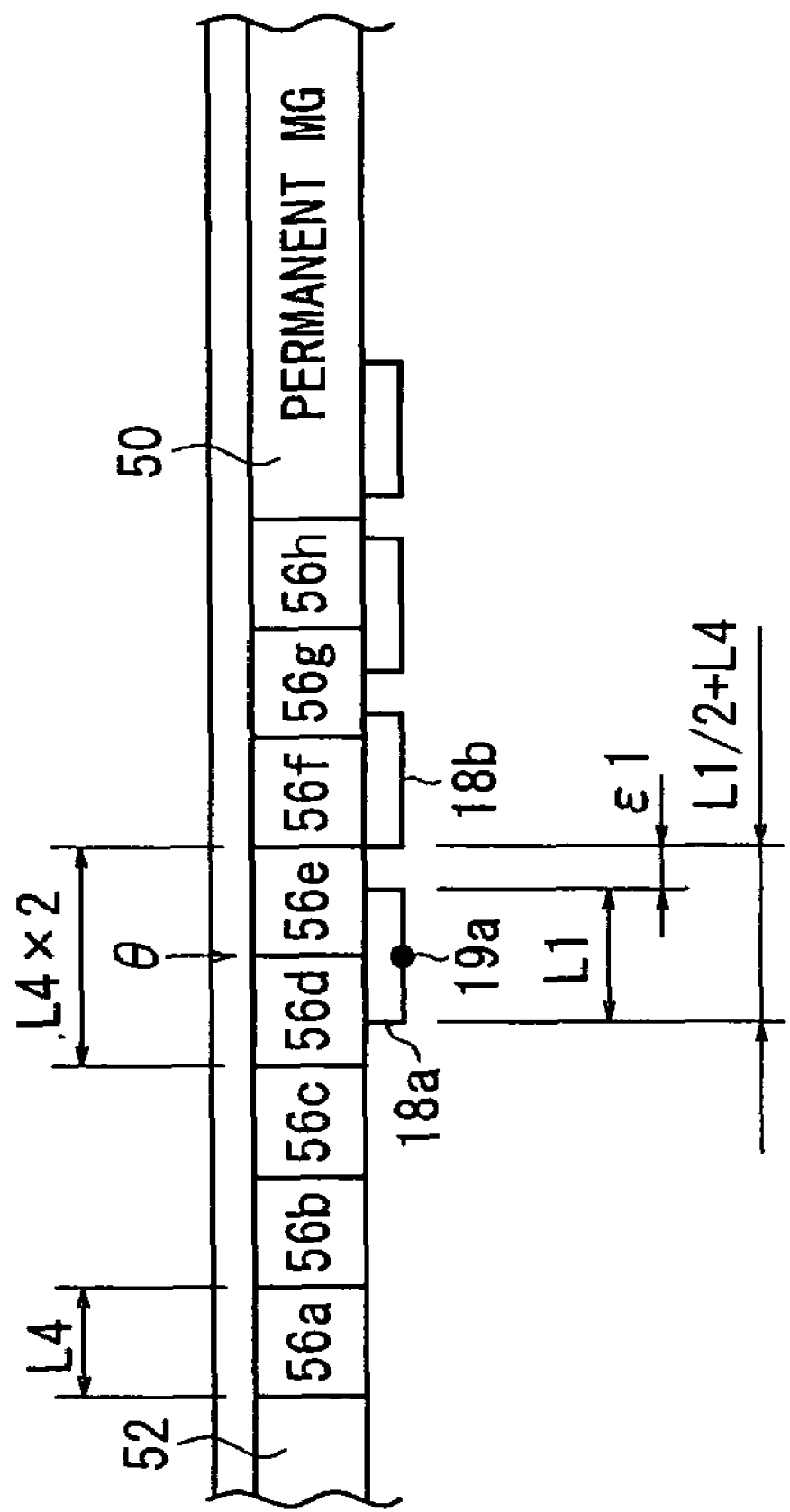
FIG. 12 is a conceptual view showing a process of determining a sheet feed length when the length of a sheet is smaller than the length of two electromagnets.

As shown in FIG. 12, when the center 19a of the leading sheet 18a reaches the position of the piling center θ, the next sheet 18b should not enter the area of the electromagnets 56d, 56e which are attracting the sheet 18a. If the next sheet 18b enters the area of the electromagnets 56d, 56e, then when the electromagnets 56d, 56e are de-energized to drop the sheet 18a, the forces attracting the next sheet 18b are weakened, tending to allow the next sheet 18b to be skewed or dropped. In step S205, if L1, which represents the length of each sheet 18, is relatively small and $\epsilon1≧P3$, then in order to prevent the next sheet 18b from entering the area of the electromagnet 56e, but allow the next sheet 18b to reach the end of the electromagnet 56f, the interval between the reference ends of sheets 18 is set to (L1/2+L4) (see FIG. 12), and the total distance L0 is divided by the interval (L1/2+L4) to determine the number M of sheets 18. The conveyor feed length L can be determined by dividing L0 by M.

By thus determining the conveyor feed length L, attractive forces for the sheet 18b are maintained, and the interval between the sheet 18a and the sheet 18b is minimized for increased feeding efficiency.

In step S206, M is determined according to M←L0/(L1+P3) and L is determined according to L←L0/M.

Figure 13:
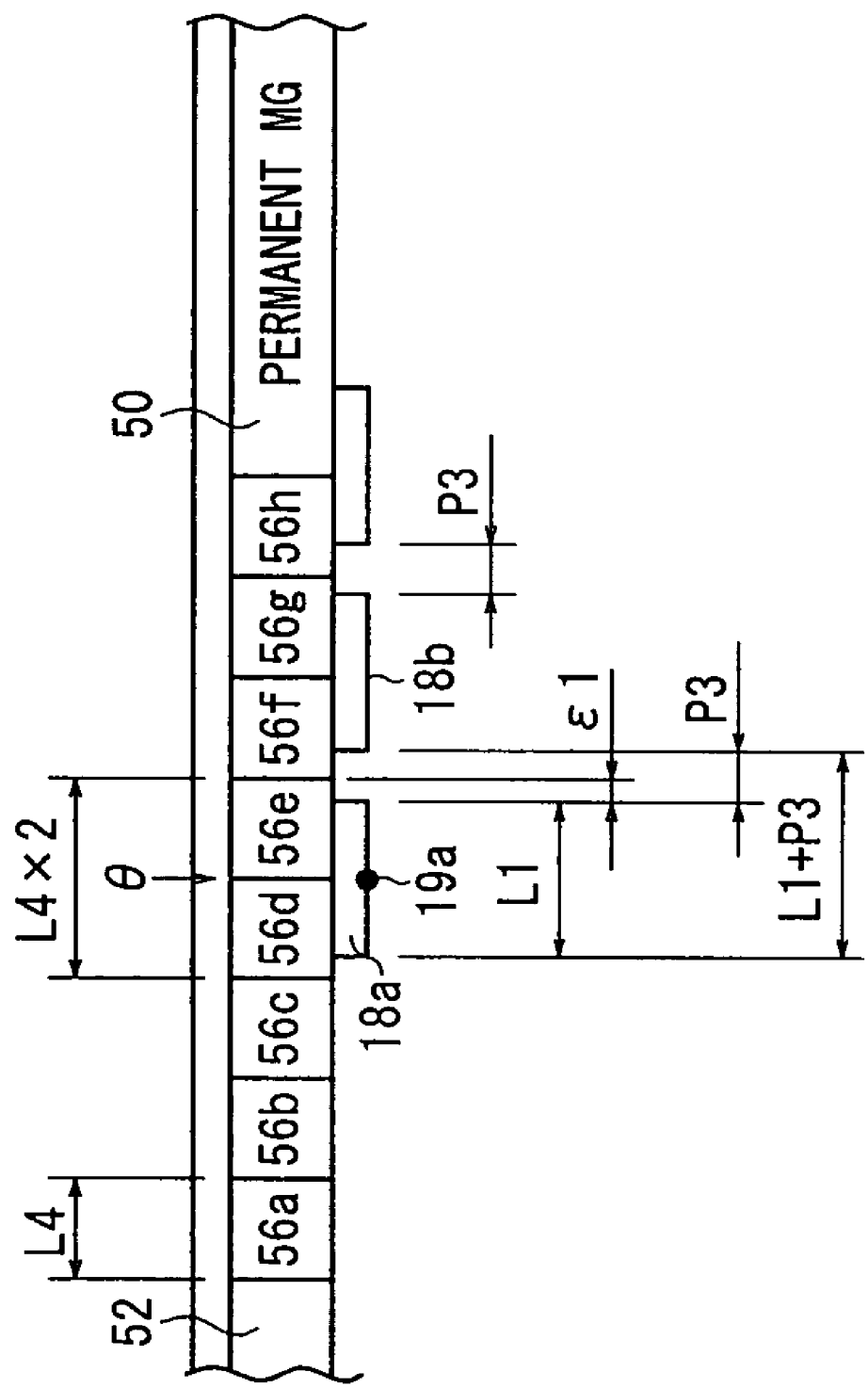
FIG. 13 is a conceptual view showing a process of determining a sheet feed length when the length of a sheet is smaller than the length of two electromagnets and particularly $\epsilon 1 < P3$.

Specifically, the interval between sheets 18 need a margin equal to or greater than the reference value P3 which is a minimum pitch. As shown in FIG. 13, if L1, which represents the length of each sheet 18, is relatively large and $\epsilon1<P3$, then in order to keep the interval between the sheet 18a and the sheet 18b equal to the reference value P3 which is a minimum pitch, the interval between the reference ends of sheets 18 is set to (L1+P3), and the total distance L0 is divided by the interval (L1+P3) to determine the number M of sheets 18. The conveyor feed length L can be determined by dividing L0 by M.

By thus determining L, the sheet 18a and the sheet 18b are prevented from becoming too close to each other and from being unduly spaced away from each other.

In step S207, i.e., if L4×2≦L1<L4×4, it is determined whether $\epsilon2≧P3$ or not. $\epsilon2=L1/2+L4×2−L1$ (see FIG. 14) and represents an interval corresponding to $\epsilon1$ in step S204. If this condition is satisfied, then control goes to step S208. If $\epsilon2$ or L1/2+L4×2−L1<P3, then control goes to step S209.

In step S208, M is determined according to M←L0/(L1/2+L4×2) and L is determined according to L←L0/M.

In step S209, M is determined according to M←L0/(L1+P3) and L is determined according to L←L0/M.

In step S210, i.e., if L4×4≦L1<L4×6, it is determined whether $\epsilon3≧P3$ or not. $\epsilon3=L1/2+L4×3−L1$ (see FIG. 15) and represents an interval corresponding to $\epsilon1$ in step S204. If this condition is satisfied, then control goes to step S211. If $\epsilon3$ or L1/2+L4×3−L1<P3, then control goes to step S212.

In step S211, M is determined according to M←L0/(L1/2+L4×3) and L is determined according to L←L0/M.

In step S212, M is determined according to M←L0/(L1+P3) and L is determined according to L←L0/M.

In step S213, i.e., if L4×6≦L1<L4×8−P3, it is determined whether $\epsilon4≧P3$ or not. $\epsilon4=L1/2+L4×4−L1$ (see FIG. 16) and represents an interval corresponding to $\epsilon1$ in step S204. If this condition is satisfied, then control goes to step S214. If $\epsilon4$ or L1/2+L4×4−L1<P3, then control goes to step S215.

In step S214, M is determined according to M←L0/(L1/2+L4×4) and L is determined according to L←L0/M.

In step S215, M is determined according to M←L0/(L1+P3) and L is determined according to L←L0/M.

In steps S208, S211, and S214, attractive forces for the sheet 18b are maintained, and the interval between the sheet 18a and the sheet 18b is minimized for increased feeding efficiency for the same reasons described in step S205. In steps S209, S212, and S215, the sheet 18a and the sheet 18b are prevented from becoming too close to each other and from being unduly spaced away from each other for the same reasons described in step S206.

After the process shown in FIG. 11, i.e., the processing in step S4, is ended, control goes to step S5 (see FIG. 4) in which the conveyor system 10 is mechanically initialized. Then, the conveyor system 10 starts to operate in step S6. At this time, the conveyor system 10 can operate efficiently based on the data set in steps S3 and S4.

Specifically, as shown in FIG. 17, cycles of accelerating, decelerating, and de-energizing the first motor 42 and the second motor 48 are successively performed in synchronism with cycles of operation of the press 16 to operate the first conveyor 22 and the second conveyor 26 intermittently. When the first motor 42 and the second motor 48 are de-energized, the first conveyor 22 and the second conveyor 26 are stopped, and as many electromagnets 56 as the number set in step S3 are de-energized for a predetermined time t1 to drop the sheet 18a at the piling center θ vertically onto the piling device 20.

Though not shown in FIG. 17, the electromagnets 44 (see FIG. 1) of the first conveyor 22 and the electromagnets 54 (see FIG. 1) of the second conveyor 26 are energized at all times.

Inasmuch as the conveyor system 10 is operated based on the data set in steps S3, S4, the synchronous feed length L, which represents the interval between sheets 18, is set to a minimum required value for increased feeding efficiency. Therefore, an operational period t2 of the press 16 can be set to a short value for increasing the production efficiency of the entire system including the press 16.

According to the present embodiment, as described above, when the operator enters necessary data on the screen 32a displayed on the monitor 32, the positions of the aligning devices 36a through 36d, the synchronous feed length L, and the number M of sheets 18, which are data required to operate the conveyor system 10, can automatically be determined. The determined data values are optimum values and do not need to be readjusted on a trial-and-error basis in trial runs of the conveyor system 10.

Of the data entered on the screen 32a, those data other than the length L1 and the distance L2 over which a sheet 18 is received by the first conveyor 22 are data that are usually not required to be changed or can automatically be set. Therefore, the operator may manually enter a length L1 and a distance L2 only, and find the data entering procedure highly easy and simple.

Although a certain preferred embodiment of the present invention has been shown and described in detail, it should be understood that various changes and modifications may be made therein without departing from the scope of the appended claims.

What is claimed is:

1. A conveyor system comprising:
a first conveyor for conveying a sheet made of a material capable of being magnetically attracted, which is cut off from sheets of various sizes to a predetermined length by a press;
a position movement unit for adjustably moving a position of the first conveyor in back-and-forth directions relative to said press;
a second conveyor for conveying the sheet supplied from said first conveyor to a stacking area while attracting the sheet to a belt with a plurality of electromagnets, and for dropping the sheet in a vertical direction onto the stacking area, wherein the position movement unit is operable to adjust the position of the first conveyor in relation to the second conveyor;
a touch panel monitor for entering sheet information including at least information as to a length of said sheet and another information as to a position where said sheet is loaded on the first conveyor from said press;
an operating condition setting unit for performing branching based on the length of said sheet and a unit length of each of said electromagnets and setting operating condition data including at least a conveyor feed length representative of a feed cycle of said sheet on said second conveyor and a number of sheets on said first and second conveyors, based on said sheet information; and
an operation controller for intermittently and independently operating said first and second conveyors based on said operation condition data.

2. A conveyor system according to claim 1, wherein said press cuts off said sheet from a steel sheet.

3. A conveyor system according to claim 1, wherein said operation condition data include information for selecting a dropping electromagnet to be de-energized to drop said sheet onto said stacking area, from said electromagnets, when the center of a leading sheet of the sheets to be fed in a conveying direction reaches a position of a piling center.

4. A method of setting operation of a conveyor system including a first conveyor for conveying a sheet made of a material capable of being magnetically attracted, which is cut from sheets of various sizes to a predetermined length by a press, a position movement unit for adjustably moving a position of the first conveyor in back-and-forth directions relative to said press, a second conveyor for conveying the sheet supplied from said first conveyor to a stacking area while attracting the sheet to a belt with a plurality of electromagnets, and for dropping the sheet in a vertical direction onto the stacking area, said method comprising the steps of:
entering sheet information including at least information as to a length of said sheet and another information as to a position where said sheet is loaded on the first conveyor from said press, via a touch-panel monitor; and
automatically determining operating condition data including at least a conveyor feed length representative of a feed cycle of said sheet on said conveyor and a number of sheets on said first and second conveyors, based on said sheet information, including the length of said sheet and a unit length of each of said electromagnets, through programmed operation of a computer.

* * * * *